(12) United States Patent
Schediwy et al.

(10) Patent No.: US 9,207,801 B2
(45) Date of Patent: Dec. 8, 2015

(54) FORCE SENSING INPUT DEVICE AND METHOD FOR DETERMINING FORCE INFORMATION

(71) Applicant: SYNAPTICS INCORPORATED, San Jose, CA (US)

(72) Inventors: Richard Schediwy, Union City, CA (US); Kipling Inscore, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 165 days.

(21) Appl. No.: 14/157,293

(22) Filed: Jan. 16, 2014

(65) Prior Publication Data

US 2014/0132563 A1 May 15, 2014

Related U.S. Application Data (63) Continuation of application No. 13/325,705, filed on Dec. 14, 2011, now Pat. No. 8,633,911.

(51) Int. Cl.
| | | |
|---|---|---|
| *G06F 3/0488* | (2013.01) | |
| *G06F 3/041* | (2006.01) | |
| *G06F 3/0354* | (2013.01) | |
| *G06F 3/01* | (2006.01) | |
| *G06F 3/044* | (2006.01) | |

(52) U.S. Cl.
CPC .............. *G06F 3/0414* (2013.01); *G06F 3/016* (2013.01); *G06F 3/03547* (2013.01); *G06F 3/044* (2013.01)

(58) Field of Classification Search
CPC ... G06F 3/03547; G06F 3/016; G06F 1/1226; G06F 1/169; G06F 3/0414
USPC .................................................. 347/173–179
See application file for complete search history.

(56) References Cited

U.S. PATENT DOCUMENTS

| | | |
|---|---|---|
| 4,558,757 A | 12/1985 | Mori et al. |
| 7,499,040 B2 | 3/2009 | Zadesky et al. |
| 8,294,047 B2 | 10/2012 | Westerman et al. |
| 2002/0163509 A1 | 11/2002 | Roberts |
| 2006/0244733 A1 | 11/2006 | Geaghan |

(Continued)

OTHER PUBLICATIONS

International Searching Authority, International Search Report and Written Opinion in PCT International Application No. PCT/US2012/067893, mailed Mar. 8, 2013.

(Continued)

*Primary Examiner* — Waseem Moorad
*Assistant Examiner* — Sujit Shah
(74) *Attorney, Agent, or Firm* — Osha · Liang LLP (57) ABSTRACT

The embodiments described herein provide devices, systems and methods that facilitate improved performance in an input device. The input device, for example, may include an input surface configured to rotate about a first axis, a proximity sensor configured to sense an input object in a sensing region proximate to the input surface of the input device, a force sensor configured to sense a force applied to the input surface of the input device, and a processing system communicatively coupled to the proximity sensor and the force sensor. The processing system may be configured to determine a position of the input object in the sensing region, and determine force information for the input object based upon the position of the input object, the force applied to the input surface, and a location of the force sensor relative to the first axis.

20 Claims, 10 Drawing Sheets

(56) References Cited

U.S. PATENT DOCUMENTS

| | | | |
|---|---|---|---|
| 2008/0144267 A1 | 6/2008 | Tanaka et al. | |
| 2009/0309616 A1* | 12/2009 | Klinghult et al. | 324/686 |
| 2010/0053116 A1 | 3/2010 | Daverman et al. | |
| 2010/0079404 A1* | 4/2010 | Degner et al. | 345/174 |
| 2010/0315373 A1* | 12/2010 | Steinhauser et al. | 345/174 |
| 2011/0063248 A1* | 3/2011 | Yoon | 345/174 |
| 2011/0141052 A1* | 6/2011 | Bernstein et al. | 345/174 |
| 2011/0141053 A1 | 6/2011 | Bulea et al. | |
| 2011/0278078 A1 | 11/2011 | Schediwy et al. | |
| 2011/0291950 A1 | 12/2011 | Tong | |
| 2011/0291951 A1* | 12/2011 | Tong | 345/173 |
| 2012/0038583 A1 | 2/2012 | Westhues et al. | |
| 2012/0086666 A1 | 4/2012 | Badaye et al. | |
| 2012/0249474 A1 | 10/2012 | Pratt et al. | |
| 2012/0287053 A1* | 11/2012 | Bos et al. | 345/173 |

OTHER PUBLICATIONS

USPTO, Non-final Office Action mailed Apr. 24, 2013 for U.S. Appl. No. 13/325,705.
USPTO, Notice of Allowance mailed Sep. 17, 2013 for U.S. Appl. No. 13/325,705.
USPTO, Response to Non-final Office Action in U.S. Appl. No. 13/325,705, filed Jul. 16, 2013.
The International Bureau of WIPO, International Preliminary Report on Patentability for International Application No. PCT/US2012/067893, mailed Jun. 26, 2014.

* cited by examiner

FORCE SENSING INPUT DEVICE AND METHOD FOR DETERMINING FORCE INFORMATION

CROSS-REFERENCE TO RELATED APPLICATIONS

This application is a continuation of, and claims priority to, U.S. application Ser. No. 13/325,705, filed Dec. 14, 2011, the entire content of which is incorporated herein by reference.

TECHNICAL FIELD

This invention generally relates to electronic devices.

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some input devices include force sensors for sensing a force applied to the input device. However, the mechanical system for mounting the input device can be complicated and expensive. Further, current input devices with force sensors may be affected by chassis twist and by a user's palm resting on the input device.

Thus, methods, systems and devices for addressing the above are desirable. Other desirable features and characteristics will become apparent from the subsequent detailed description and the appended claims, taken in conjunction with the accompanying drawings and the foregoing technical field and background.

BRIEF SUMMARY

In one exemplary embodiment an input device is provided. The input device may include, but is not limited to, an input surface configured to rotate about a first axis, a proximity sensor configured to sense an input object in a sensing region proximate to the input surface of the input device, a force sensor configured to sense a force applied to the input surface of the input device, and a processing system communicatively coupled to the proximity sensor and the force sensor. The processing system may be configured to determine a position of the input object in the sensing region, and determine force information for the input object based upon the position of the input object, the force applied to the input surface, and a location of the force sensor relative to the first axis.

In another exemplary embodiment a processing system for an input device is provided. The input device may include an input surface configured to rotate about a first axis and further configured to be touched by input objects and a force sensor configured to determine a force applied to the input surface. The processing system may include, but is not limited to, sensing circuitry configured to sense input in a sensing region of the input device and the force applied to the input surface, and a determination module configured to determine force information for the input object based upon a position of the input object on the input surface, the force applied to the input surface, and a location of the force sensor relative to the first axis.

In yet another exemplary embodiment a method for determining force information for an input object interacting with an input device having an input surface configured to rotate about an axis and configured to be touched by input objects and a force sensor coupled to the input surface and configured to determine a representation of force applied to the input surface is provided. The method may include, but is not limited to, determining a position of an input object, and determining force information for the input object based upon the position of the input object on the input surface, the representation of force applied to the input surface, and a location of the force sensor relative to the axis.

BRIEF DESCRIPTION OF DRAWINGS

Exemplary embodiments will hereinafter be described in conjunction with the appended drawings, where like designations denote like elements, and.

DETAILED DESCRIPTION OF THE DRAWINGS

The following detailed description is merely exemplary in nature and is not intended to limit the embodiments or the application and uses of the embodiments. Furthermore, there is no intention to be bound by any expressed or implied theory presented in the preceding technical field, background, brief summary or the following detailed description.

Various embodiments provide input devices and methods that facilitate improved usability. As discussed below, the input device includes a rotatable input surface and a force sensor. The input surface may be mounted to a chassis or casing of the input device using a rotating mounting structure. This mounting structure provides a simple and low cost method for mounting and allowing rotation of the input surface to the input device. Further, the mounting structure may be less affected by chassis twist and chassis deformation caused by a user's palm resting on the chassis. However, because the input surface is rotatable, the position of the touch relative to an axis of rotation and the force sensor affects the amount of force the force sensor detects. Accordingly, the output of the force sensor is scaled to account for the rotation of the input surface, as discussed in further detail below.

Figure 1:
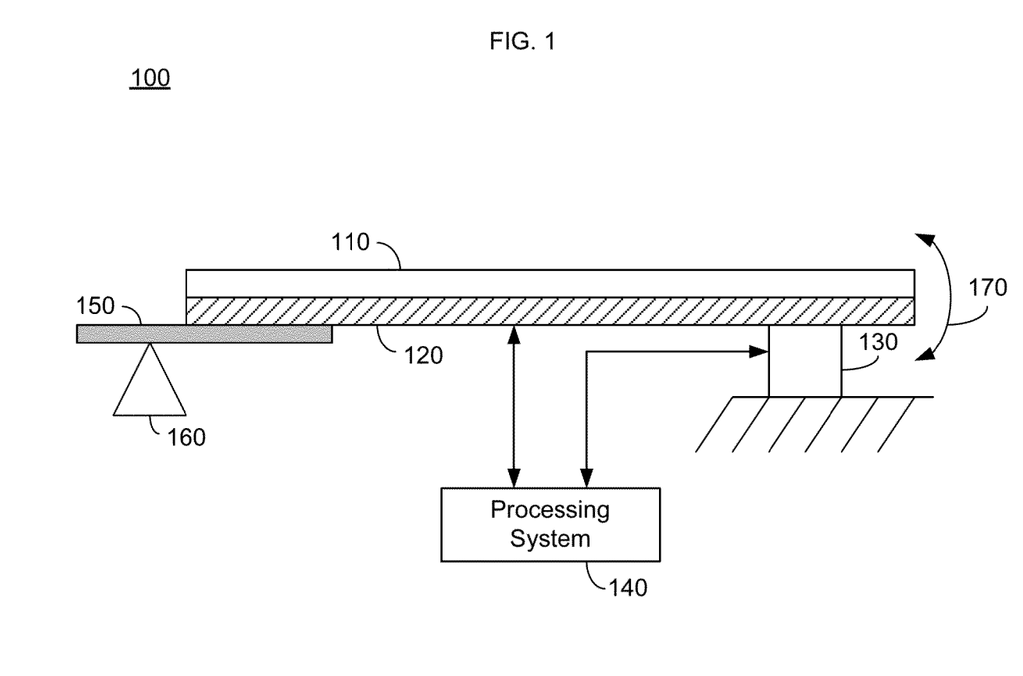
FIG. 1 illustrates an exemplary input device 100 in accordance with an embodiment.

Turning now to the figures, FIG. 1 illustrates an exemplary input device 100. The input device 100 includes an input surface 110, at least one sensing electrode 120, a force sensor 130 for sensing a force applied to the input surface 110 and a processing system 140. The input surface 110 and at least one sensing electrode 120 are configured to rotate about a an axis 160 via mounting structure 150. The mounting structure 150 and force sensor 130 are preferably mounted on opposite ends of the input surface 110 and at least one sensing electrode 120, as illustrated in FIG. 1. The mounting structure 150 allows the input surface 110 and the at least one sensing electrode 120 to rotate about the axis 160, represented as a fulcrum in FIG. 1, as illustrated by arrow 170. In one embodiment, for example, the edge of the input surface 110 and at least one sensing electrode 120 furthest from the axis 160 may only rotate approximately one to two tenths of a millimeter. However, the amount of rotation can vary depending upon the needs of the input device 100 and the sensitivity of the force sensor 130.

Because the input surface 110 and the at least one sensing electrode 120 are rotatable, the amount of force detected by the force sensor 130 from an input object will vary depending upon the location of the input object on the input surface 110. For example, an input object applying identical amounts of force on the input surface 110 at the edge of the input surface furthest from the force sensor 130 and at a location directly above the force sensor 130 would result in different outputs from the force sensor 130. For example, the output from the force sensor 130 would be larger for the second touch, even though identical force was applied in both touches. Accordingly, the processing system 140 determines force information for an input object based upon the amount of force detected by the force sensor, the location of the input object, and the location of the force sensor, as discussed in further detail below. The processing system 140 can emulate various types of user input based upon the force information. Furthermore, the processing system 140 can emulate various types of user input based upon a combination the force information and at least one of a number of input objects, the position of the one or more input object and a duration the one or more input objects were touching the input surface 110, herein after referred to as "input information". The types of user input may include, but are not limited to, pointing, tapping, selecting, clicking, double clicking, panning, zooming, and scrolling. For example, the processing system may emulate a left-click if the input information meets a predetermined input metric. The input metric may be, for example, a predetermined force range, a combination of a force range and a length of time the input object is in contact with the input surface 110, a combination of a force range and a position of the input objects in contact with the input surface 110, or a combination of a force range, a length of time, and a position of the input objects in contact with the input surface 110. The input metric may also depend upon the number of input objects contacting the input surface 110. The processing system may also determine an initiation and/or rate or speed of a user interface action, such as a scroll, zoom, or pan, for example, based upon at least one of the force information and the positional information.

Figure 2:
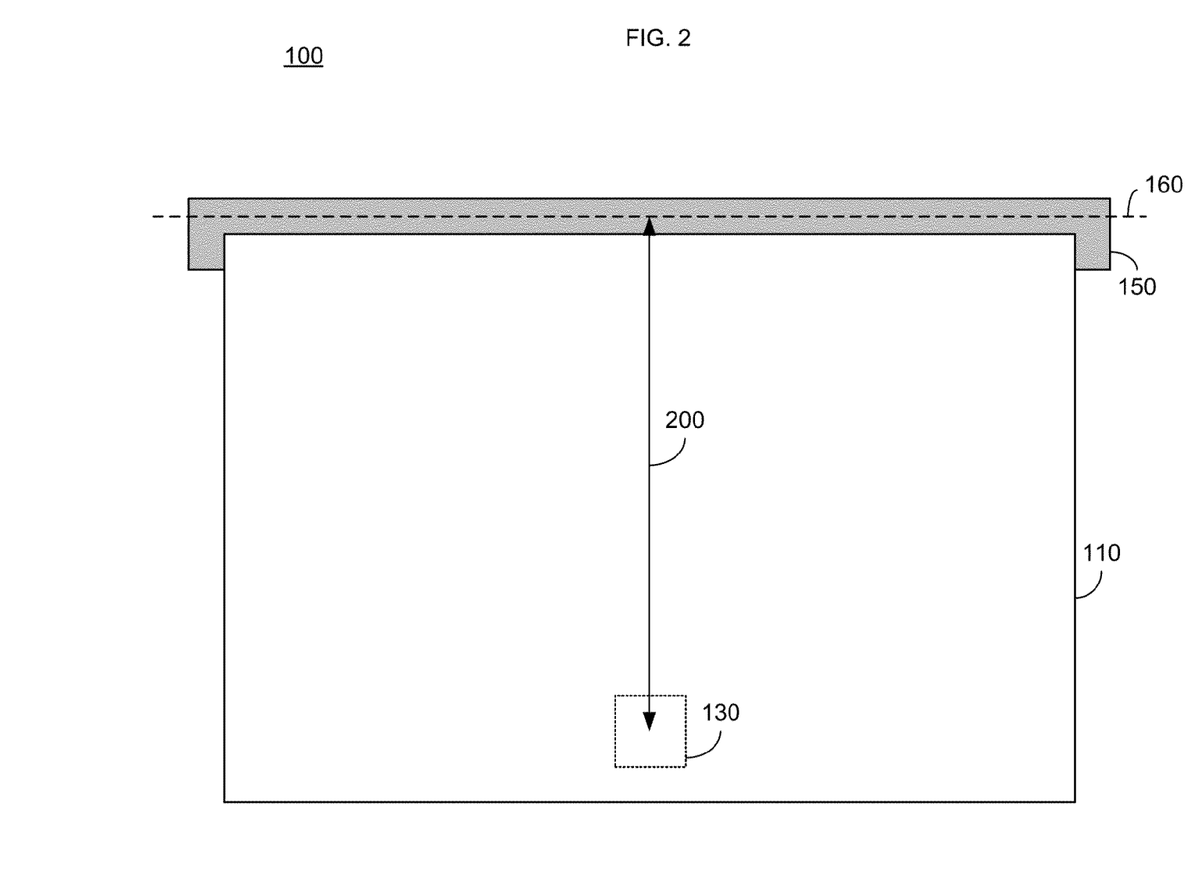
FIG. 2 illustrates a top view of the input device illustrated in FIG. 1 in accordance with an embodiment.

FIG. 2 illustrates a top view of an exemplary input device 100 in accordance with an embodiment. The mounting structure 150 illustrated in FIG. 2 is a thin piece of metal. In other embodiments, for example, the mounting structure 150 may be a thin piece of plastic or any other semi-flexible material. In other embodiments, for example, the mounting structure 150 may be a piano hinge, bearing(s), a gimbal joint or any other type of hinge or mechanism configured to rotate and/or deflect the input surface 110 in response to a force from an input object. As seen in FIG. 2, the axis 160 is located above the top edge of the input surface 110. In one embodiment, the axis 160 is located outside of the input surface area.

Figure 3:
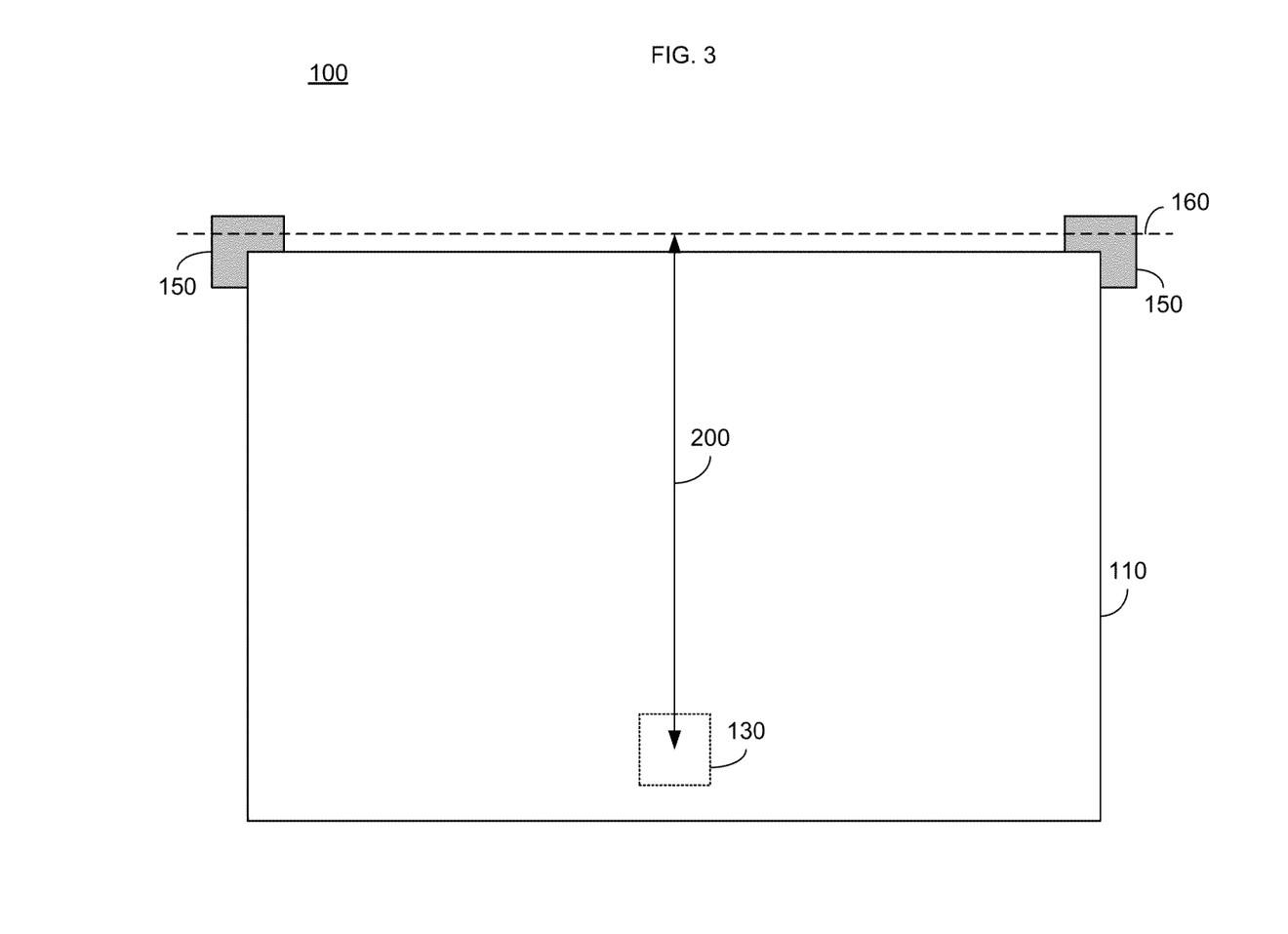
FIG. 3 illustrates a top view of another exemplary input device in accordance with an embodiment.

FIG. 3 illustrates a top view of another exemplary input device 100 in accordance with an embodiment. As seen in FIG. 3, the input device includes two mounting structures 150, located at the corners of the input surface 110 near the axis 160. As with the embodiment illustrated in FIG. 2, the mounting structures 150 may be any material or mechanism configured to rotate and/or deflect the input surface 110 in response to a force from an input object.

Figure 4:
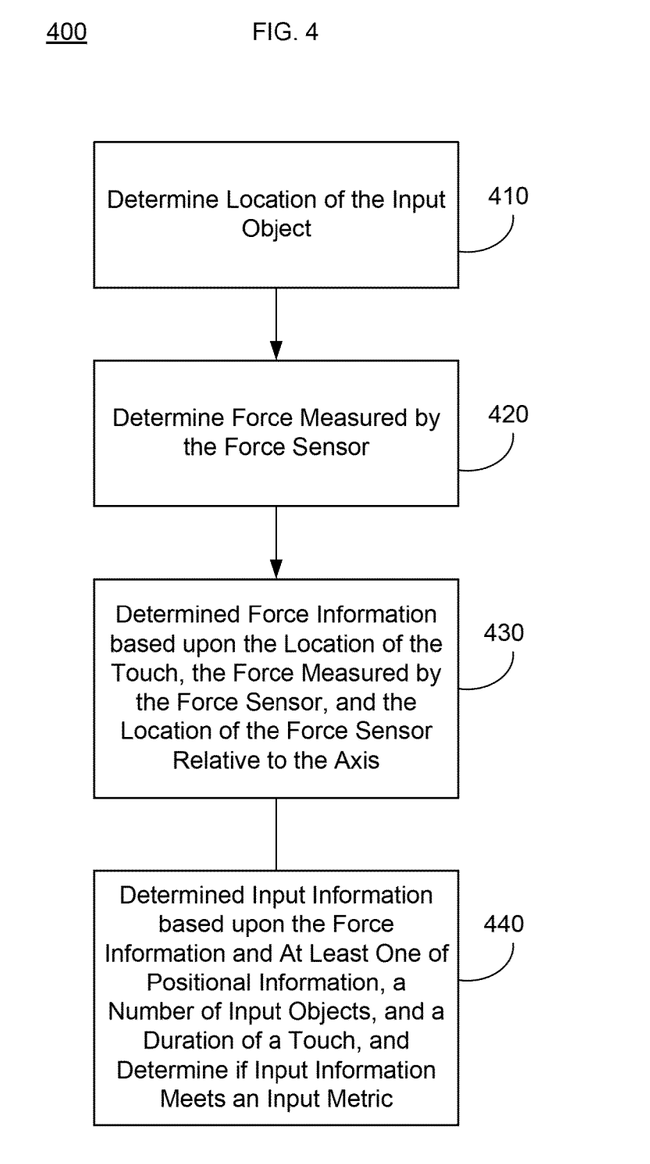
FIG. 4 is a flow diagram illustrating a method for determining force information for an input device, in accordance with an embodiment.

FIG. 4 is a flow diagram illustrating a method 400 for determining force information for the input device 100. The method begins by determining a location of an input object in contact with the input surface. (Step 410). In one embodiment, if multiple input objects are in contact with the input surface, the location of the touch may be based upon the first or subsequent input object to touch the input surface 110 or a consolidated location. For example, a location in the middle of the multiple input objects may be used as the consolidated location of the input objects. A force measured by the force sensor 130 is then determined (Step 420). As discussed above, the amount of force measured by the force sensor may not accurately represent the force applied by the input object to the input surface.

Once the location of the touch and the force measured by the force sensor 130 are known, the processing system 140 can determine force information for the input object(s) based on a known location of the force sensor (Step 430). The location of the force sensor 130 relative to the axis 160 may be stored, for example, in a memory of the processing system. As described above, the distance of the force sensor 130 from the axis 160, as illustrated by arrow 200 in FIG. 2, affects the amount of force the force sensor 130 will detect from any given touch. Since the input surface 110 acts like a lever, when the force sensor 130 is further from the axis 160 the force sensor 130 will measure less force than if the force sensor 130 was closer to the axis 160, given an identical input. In one embodiment, for example, the processing system 140 may scale the force measured by the force sensor based upon the location of the touch and the location of the force sensor relative to the axis. Accordingly, input objects imparting an identical amount of force on the input surface 110 should have approximately the same force information. After the force information is determined, the processing system can determine input information for the input object(s) and determine if the input information meets a input metric (Step 440), as discussed in further detail below.

Figure 5:
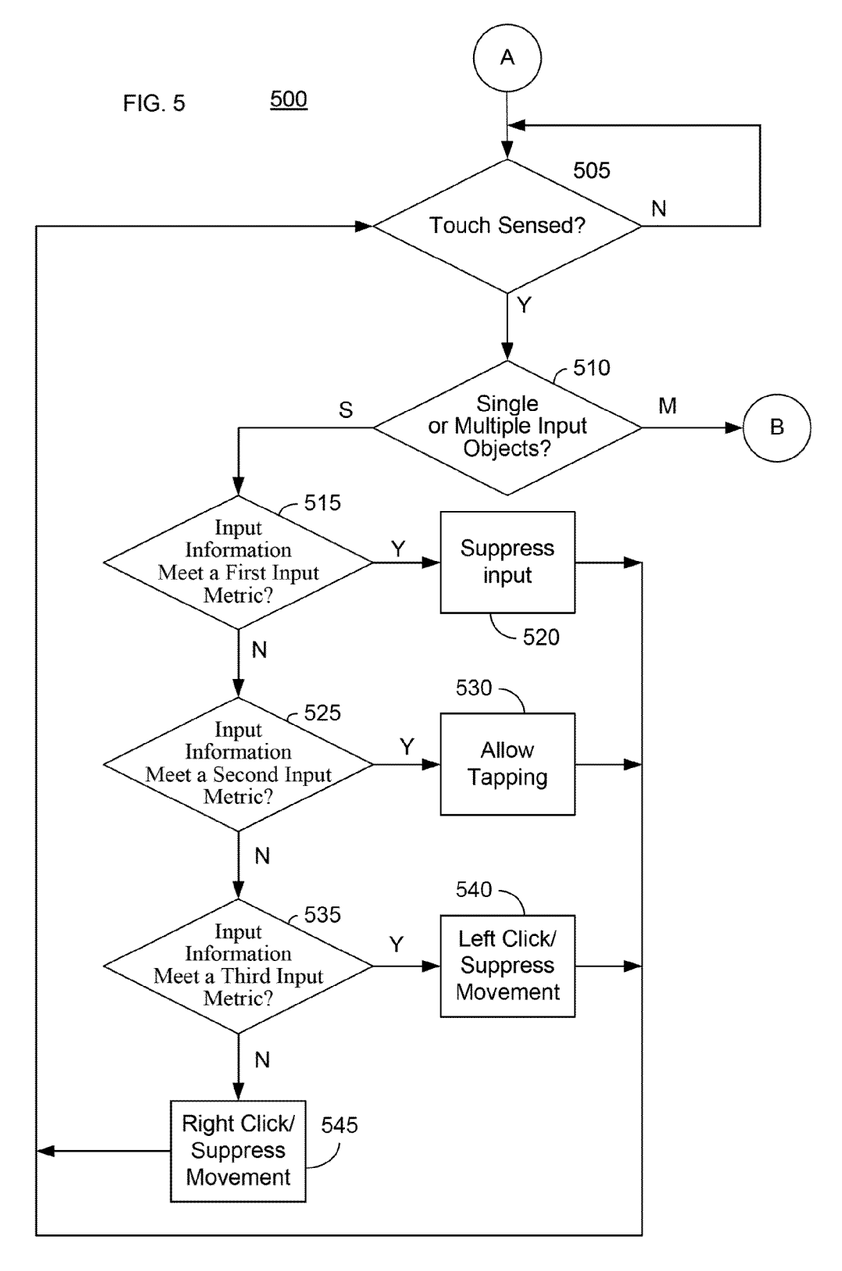
FIGS. 5 & 6 are flow charts illustrating an exemplary method for controlling the input device in accordance with an embodiment.
Figure 6:
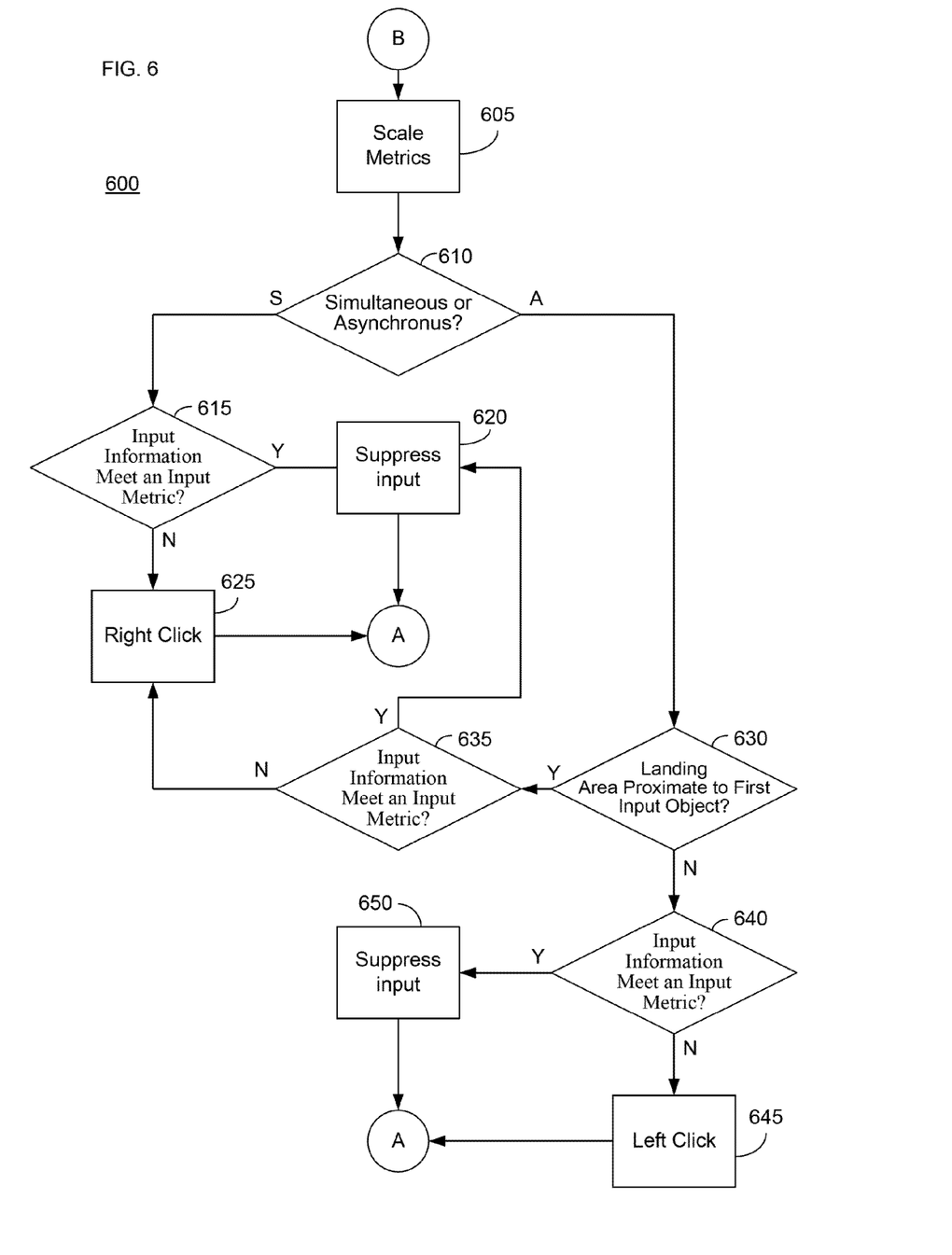

FIGS. 5 & 6 are flow charts illustrating an exemplary method 500 for controlling the input device 100 in accordance with an embodiment. The processing system 140 monitors the at least one sensing electrode 120 to determine if an input object is touching the input surface 110. (Step 505). The processing system 140 further determines if a single input object or multiple input objects are touching the input surface. (Step 510).

If only a single input object is touching the input surface 110, the processing system determines if the input information (determined in part via the method 400) meets a first input metric. (Step 515). As described above, in one embodiment, the first input metric may correspond to a first force value range, a combination of a force value range and a length of time the input object was in contact with the input surface 110, a combination of a force value range and a position of the input object in contact with the input surface 110, or a combination of a force value range and a length of time and a position of the input object in contact with the input surface 110. As discussed in further detail below, the input metrics and/or force values may be scaled based upon the number of input object touching the input surface 110. If the input information meets a first input metric, the processing system may ignore any input and suppress reporting any location, force or movement of the input object. (Step 520). In one embodiment, the processing system uses force information along with a time of contact between the input object and the input surface to determine if to ignore any input on the input surface. For example, an input determined to be in contact with the input surface for a time less than a first time metric, may be determined to be a light tap by the input object. An input determined to be in contact with the input surface for a time longer than a first time metric, may be determined to be a resting input object and any input associated with the object is suppressed. The processing system then returns to Step 505 to continue to monitor for input objects.

If the input information does not meet a first input metric, the processing system 140 then determines if the force information meets a second input metric. (Step 525). In one embodiment, for example, the second input metric may be a force value range, a combination of a force value range and a length of time the input object was in contact with the input surface 110, a combination of a force value range, a position of the input object in contact with the input surface 110, or a combination of a force value range, a length of time and a position of the input object in contact with the input surface 110. If the input information meets the second force metric, the processing system 140 could allow both pointing and tapping. In other embodiments, the processing system may emulate a first type of user input such as a left click, a right-click, a middle-click, a scroll, zoom, highlight or any other type of user input, as described above. In one embodiment, the processing system uses force information along with a time of contact between the input object and the input surface to determine if to ignore/allow any input on the input surface. (Step 530). The processing system then returns to Step 505 to continue to monitor for input objects.

If the input information does not meet the second input metric, the processing system 140 then determined if the input information meets a third input metric. (Step 535). In one embodiment, for example, the third input metric may be a force value range, a combination of a force value range and a length of time the input object was in contact with the input surface 110, a combination of a force value range and a position of the input object in contact with the input surface 110, or a combination of a force value range, a length of time the input object is in contact with the input surface 110 and a position of the input object on the input surface 110. If the input information meets the third force metric, the processing system 140 could suppress movement and emulates a second type of user input. (Step 540). The processing system then returns to Step 505 to continue to monitor for input objects. In one embodiment, for example, the second type of user input may be a left-click. In other embodiments, the second type of user input may be a right-click, a middle-click, a scroll, zoom, highlight or any other type of user input.

In one embodiment, for example, if the input information does not meet the third input metric, the processing system 140 suppresses movement and emulates a user input. (Step 545). In one embodiment, for example, the user input may be a right-click. However, any type of user input may be emulated. The processing system then returns to Step 505 to continue to monitor for input objects.

While the embodiment illustrated in FIG. 5 illustrates comparing at least the force information generated using the method in FIG. 4 against three input metrics, any number of input metric metrics can be used to emulate any number of user inputs. As described above, the input metrics may be a force value range, a combination of a force value range and a length of time the input object was in contact with the input surface 110, a combination of a force value range and a position of the input object in contact with the input surface 110, or a combination of a force value range, a length of time the input object was in contact with the input surface 110 and a position of the input object with respect to the input surface 110. It should be appreciated that some uniquely different force, position and/or time values may meet the same input metric. For example, in some embodiments, input information for an input object comprising, a force value F, a location X, Y and a time of contact T may meet a first input metric. While input information for an input object comprising a force value F', a location X', Y' and a time of contact T' (where the prime values are uniquely different from the non-prime values) may also meet the first input metric. Furthermore, input information for an input object comprising a force value F, a location X',Y and a time of contact T' may not meet a first input metric. While FIG. 5 illustrates one exemplary embodiment of various input metrics which can be met by the input information to perform a type of user input, it should be appreciated that different input information (as described above) may meet the same input metric, resulting in the same type of user input. It should be further appreciated, that different input information may meet different input metrics, resulting in the same type of user input. Furthermore, the same type of user input may provide different functionality based on a component of the input information. For example, different values of F, X/Y and T may result in the same type of user input (e.g. panning, zooming, etc), that type of user input may behave differently based upon said values (e.g. zooming faster, panning slower, etc). Furthermore, while FIG. 5 illustrates a method where the processing system 140 is determining if the input information meets one of a number of input metrics by comparing the input information to each input metric, other processing methods can be used. For example, in one embodiment the input metrics can be organized in a tree structure and the processing system 140 can traverse the tree structure to determine which input metric has been met.

Turning to FIG. 6, in one embodiment, if multiple input objects are touching the surface, the processing system 140 scales the input metrics. (Step 605). For example, the processing system 140 may scale the input metrics based upon a number of input objects touching the input surface 110. In other words, the processing system 140 increases the amount of combined force necessary to meet a metric. The processing system 140 then determines if the multiple input objects touched the input surface substantially simultaneously or asynchronously. (Step 610). In other words, the processing system 140 determines if the multiple input objects touched the input surface 110 within a predetermined time, or if a second input object began touching the input surface 110 substantially after the first input object began touching the input surface 110.

If the input objects were determined to substantially simultaneously touch the input surface 110, the processing system 140 then determines if the input information for the multiple input objects generated via the method illustrated in FIG. 4 meets an input metric. (Step 615). If the input information does not meet the input metric, the processing system may suppress any input. (Step 620). The processing system then returns to Step 505 to continue to monitor for input objects. If the force information does meet the input metric, the processing system may emulate a type of user input. (Step 625). In one embodiment, for example, the type of user input may be a right click. However, other user inputs such as a left click, a middle-click, a scroll, zoom, highlight or any other type of user input may be emulated. The processing system then returns to Step 505 to continue to monitor for input objects.

If the processing system 140 determines that the input objects asynchronously touched the input surface 110, the processing system 140 determines if input information of the second input object comprises a substantially co-linear (i.e., next to) position next first input object. (Step 630). If the second input object is substantially co-linear (i.e., next to) the first input object, the processing system 140 determines if the input information for the first and second input objects calculated using at least the method illustrated in FIG. 4 meets an input metric. (Step 635). In one embodiment, if the input information does not meet the input metric, the processing system may suppress any input. (Step 620). The processing system then returns to Step 505 to continue to monitor for input objects. If the input information does meet the input metric, the processing system may emulate a type of user input. (Step 625). In one embodiment, for example, the user input may be a right-click. However, other user inputs may be emulated such as, a left-click, middle-click, a scroll, zoom, highlight, panning, tapping, clicking or any other type of user input. The processing system then returns to Step 505 to continue to monitor for input objects.

If the second input object is not substantially co-linear (i.e., next to) the first input object, the processing system 140 determines if the input information for the first and second input objects calculated using at least the method illustrated in FIG. 4 meets an input metric. (Step 640). In one embodiment, for example, the processing system 140 determines a differential force imparted by the arrival of the second input object. If the input information or the differential force does not meet the force metric, the processing system may suppress any input. (Step 650). In another embodiment, if the input information or the differential force does not meet the input metric, the processing system may suppress any input from the second input object. The processing system then returns to Step 505 to continue to monitor for input objects. If the input information or differential force does meet the input metric, the processing system may emulate a type user input. (Step 645). In one embodiment, for example, the user input may be a left-click. However, other user inputs may be emulated such as, a left-click, middle-click, a scroll, zoom, highlight, panning, tapping, clicking or any other type of user input. The processing system then returns to Step 505 to continue to monitor for input objects.

Figure 7:
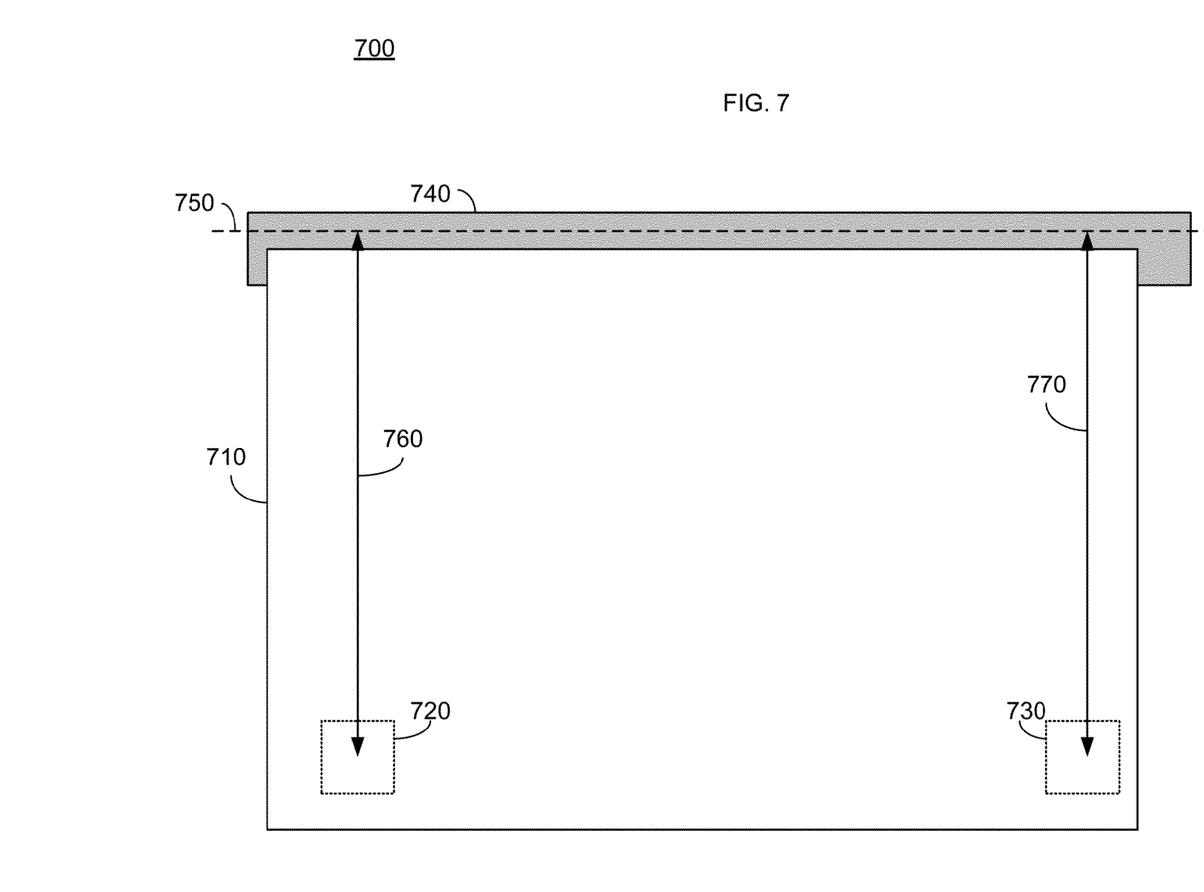
FIG. 7 illustrates a top view of another exemplary input device in accordance with an embodiment.

FIG. 7 illustrates a top view of another exemplary input device 700 in accordance with an embodiment. The input device 700 includes an input surface 710 and force sensors 720 and 730. The input surface 710 is connected to a first mounting structure 740 which allows the input surface 710 to rotate about a first axis 750. In the embodiment illustrated in FIG. 7, the force sensors 720 and 730 are positioned in the lower left and lower right corner of the input surface 710, respectively. In operation, the input device 700 operates similar to the input devices illustrated in FIGS. 1-3. However, in this embodiment force information is determined for each force sensor 720 and 730 based upon the location of the input object, the force measured by each sensor 720 and 730 and the location of each force sensor relative to the axis 750, as illustrated by arrows 760 and 770, respectively.

Figure 8:
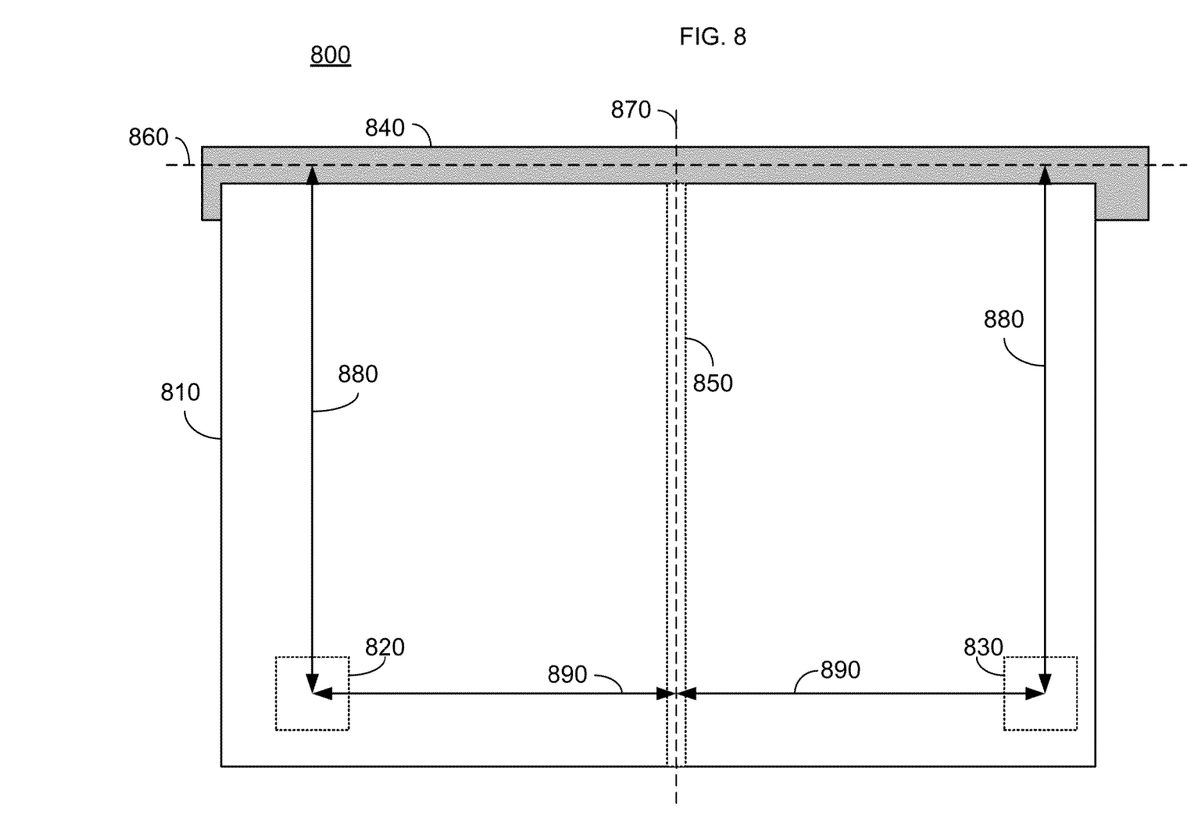
FIG. 8 illustrates a top view of yet another exemplary input device in accordance with an embodiment.

FIG. 8 illustrates a top view of another exemplary input device 800 in accordance with an embodiment. The input device 800 includes an input surface 810 and force sensors 820 and 830. The input surface 810 is connected to a first mounting structure 840 and a second mounting structure 850. The first mounting structure 840 allows the input surface 810 to rotate about a first axis 860. Likewise, the second mounting structure 850 allows the input surface 810 to rotate about a second axis 870. In one embodiment, for example, the first axis 860 and second axis 870 are substantially perpendicular to each other. In the embodiment illustrated in FIG. 8, the second mounting structure 850 and second axis 870 are positioned in the middle of the input surface 810. However, the second hinge 850 and second axis 870 could be positioned anywhere along the input surface 810. The force sensors 820 and 830 are preferably positioned on opposite sides of the axis 870 and are preferable positioned as far from both axis 860 and axis 870 as is possible.

In the embodiment illustrates in FIG. 8, the first and second mounting structures 840 and 850, are shown to extend the full width and length of the input surface 810. However, as described above, the mounting structures may comprise a piano hinge, bearing(s), a gimbal joint or any other type of hinge or mechanism configured to rotate and/or deflect the input surface 810 in response to a force from an input object. Thus the mounting structure may only extend partially along the input surface or be near specific regions of the input surface (e.g. corners, etc). It should be appreciated that in a symmetrical layout (i.e. locations of force sensors 720/820 and 730/830 relative to the first and second axis being identical), force information from force sensors 720/820 and 730/830 should be substantially the same. Yet, because of various factors, such as manufacturing tolerances, device construction and mounting, and calibration, among others; use of multiple force sensors may allow the input device to operate more accurately since the force sensors can be used to calibrate one another and to compensate for manufacturing and assembly variances.

Figure 9:
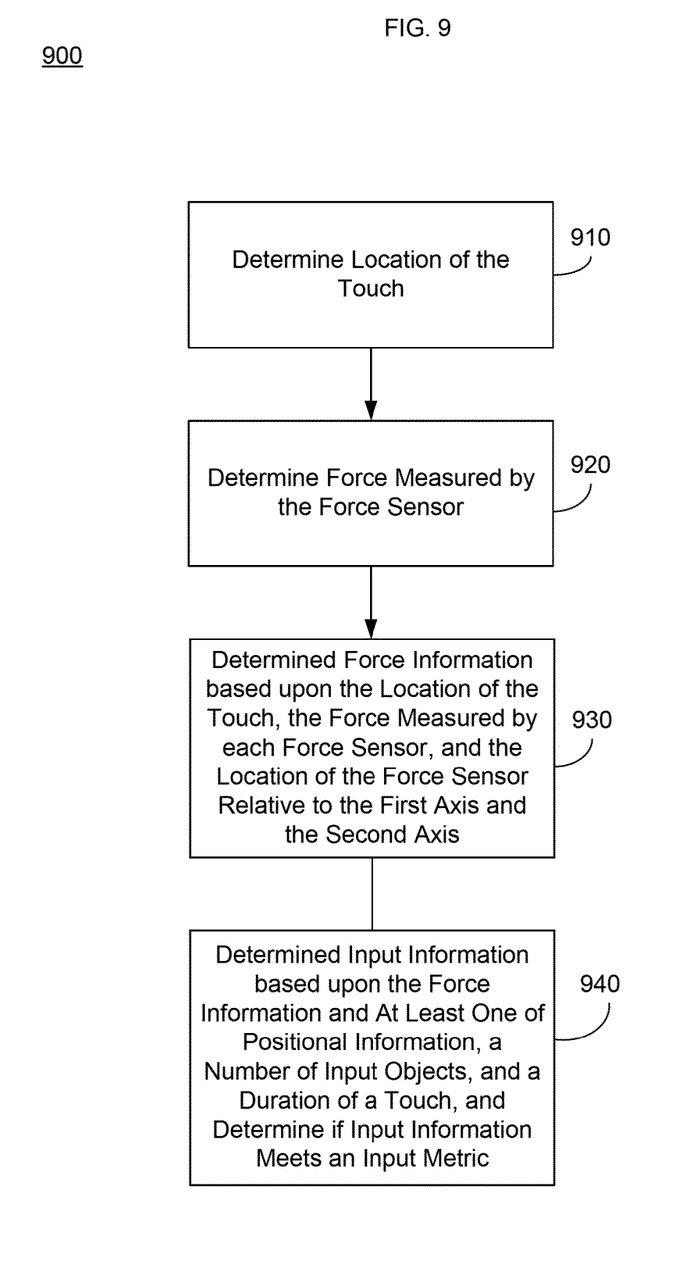
FIG. 9 illustrates a method for determining force information for the input device illustrated in FIG. 9.

FIG. 9 illustrates a method 900 for determining force information for the input device 800 illustrated in FIG. 8. The method begins by determining a location of a touch on the input surface by an input object. (Step 910). In one embodiment, for example, if multiple input objects are detected, the location of the touch may be based upon the last object to touch the input surface 110. Similarly, if multiple input objects are detected, the force information may be a total force of all input objects, or a differential force between the multiple objects. In another embodiment, a location in the middle of the multiple input objects or an average position could be selected as the location. In yet another embodiment, the location of the first input object could be selected as the location. In other embodiments, a location of a first input object may be used to calculate force information for one of the force sensor 820 and 830 and a location of a second object may be used to calculate the force information for the other of the force sensor 820 and 830.

A force measured by each force sensor 820 and 830 is then determined (Step 920). In another embodiment, only one of the force sensors 820 and 830 may be used to calculate the force information. In this embodiment, for example, the force sensor closest to the input object may be used. In another embodiment, a force sensor located on the same side of the axis 870 as the input object may be used to determine the force information.

Once the location of the touch and the force measured by each force sensor 820 and 830 are known the processing system 140 can determine force information for the touch using a known location of each force sensor. (Step 930). The location of each force sensor 820 and 830 relative to the first axis 860 and second axis 870 may be stored, for example, in a memory. The distance of each force sensor 820 and 830 from the first axis 860 and second axis 870, as illustrated by arrows 880 and 890 in FIG. 8, also affects the amount of force each force sensor 820 and 830 will detect from any given touch. Since the input surface 810 acts like a lever, when the force sensor 820 and 830 are further from the axes 860 and 870 the force sensors 820 and 830 will measure less force than if the force sensors 820 and 830 were closer to the axes 860 and 870, given an identical input. While the force sensors 820 and 830 are illustrated as having the same distance from the respective axes 860 and 870, as illustrated by arrows 880 and 890, the force sensors 820 and 780 could also be positioned asymmetrically. After the force information is determined, the processing system can determine input information for the input object(s) and determine if the input information meets an input metric (Step 940), as discussed above.

In one embodiment, for example, the processing system 140 may scale the force measured by each force sensor based upon the location of the touch and the location of the respective force sensor. Accordingly, input objects imparting an identical amount of force on the input surface 810 should have approximately the same force information.

Figure 10:
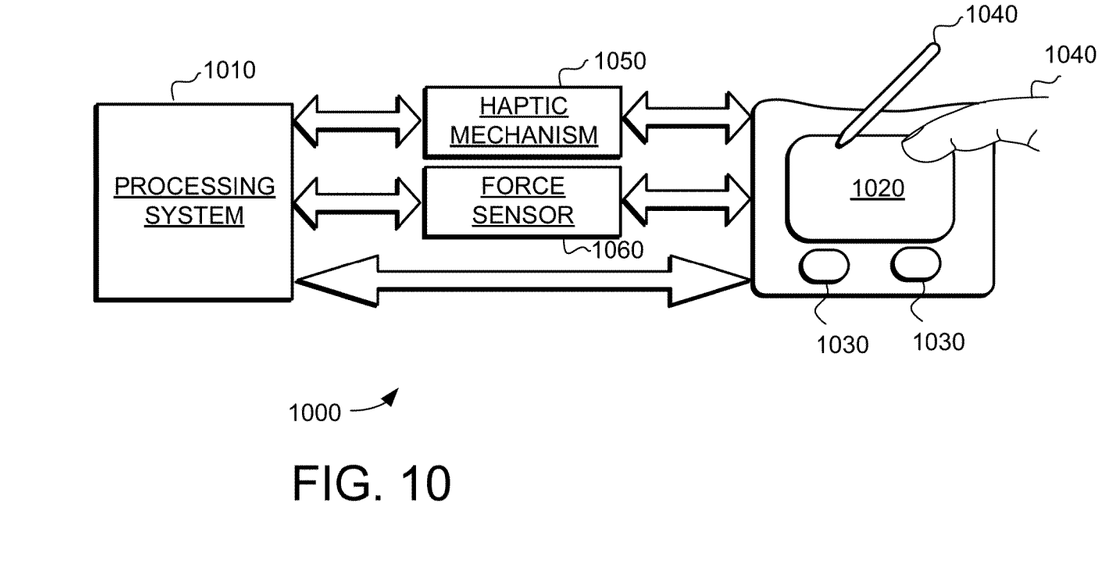
FIG. 10 is a block diagram of another exemplary input device, in accordance with an embodiment.

FIG. 10 is a block diagram of another exemplary input device 1000, in accordance with an embodiment. The input device 900 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 900 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 1000 can be implemented as a physical part of the electronic system, or can be physically separate from the electronic system. As appropriate, the input device 1000 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 10, the input device 1000 is shown as a proximity sensor device (also often referred to as a "touchpad" or a "touch sensor device") configured to sense input provided by one or more input objects 1040 in a sensing region 1020. Example input objects include fingers and styli, as shown in FIG. 10.

Sensing region 1020 encompasses any space above, around, in and/or near the input device 1000 in which the input device 1000 is able to detect user input (e.g., user input provided by one or more input objects 1040). The sizes, shapes, and locations of particular sensing regions may vary widely from embodiment to embodiment. In some embodiments, the sensing region 1020 extends from a surface of the input device 1000 in one or more directions into space until signal-to-noise ratios prevent sufficiently accurate object detection. The distance to which this sensing region 1020 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 1000, contact with an input surface (e.g. a touch surface) of the input device 1000, contact with an input surface of the input device 1000 coupled with some amount of applied force, and/or a combination thereof. In various embodiments, input surfaces may be provided by surfaces of casings within which the sensing electrodes reside, by face sheets applied over the sensing electrodes or any casings, etc. In some embodiments, the sensing region 1020 has a rectangular shape when projected onto an input surface of the input device 1000.

The input device 1000 may utilize any combination of sensor components and capacitive sensing technologies to detect user input in the sensing region 1020. For example, the input device 1000 comprises one or more sensing elements for capacitively detecting user input.

Some implementations are configured to provide images that span one, two, or three dimensions in space. Some implementations are configured to provide projections of input along particular axes or planes.

In some capacitive implementations of the input device 1000, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensing electrodes. Some capacitive implementations utilize resistive sheets, which may be uniformly resistive.

Some capacitive implementations utilize "self capacitance" (or "absolute capacitance") sensing methods based on changes in the capacitive coupling between sensing electrodes and an input object. In various embodiments, an input object near the sensing electrodes alters the electric field near the sensing electrodes, thus changing the measured capacitive coupling. In one implementation, an absolute capacitance sensing method operates by modulating sensing electrodes with respect to a reference voltage (e.g. system ground), and by detecting the capacitive coupling between the sensing electrodes and input objects.

Some capacitive implementations utilize "mutual capacitance" (or "transcapacitance") sensing methods based on changes in the capacitive coupling between sensing electrodes. In various embodiments, an input object near the sensing electrodes alters the electric field between the sensing electrodes, thus changing the measured capacitive coupling. In one implementation, a transcapacitive sensing method operates by detecting the capacitive coupling between one or more transmitting electrodes and one or more receiving electrodes. Transmitting sensing electrodes may be modulated relative to a reference voltage (e.g., system ground) to facilitate transmission, and receiving sensing electrodes may be held substantially constant relative to the reference voltage to facilitate receipt. Sensing electrodes may be dedicated transmitters or receivers, or may be configured to both transmit and receive.

In FIG. 10, a processing system (or "processor") 1010 is shown as part of the input device 1000. The processing system 1010 is configured to operate the hardware of the input device 1000 to detect input in the sensing region 1020. The processing system 1010 comprises parts of or all of one or more integrated circuits (ICs) and/or other circuitry components; in some embodiments, the processing system 1010 also comprises electronically-readable instructions, such as firmware code, software code, and/or the like. In some embodiments, components composing the processing system 1010 are located together, such as near sensing element(s) of the input device 1000. In other embodiments, components of processing system 1010 are physically separate with one or more components close to sensing element(s) of input device 1000, and one or more components elsewhere. For example, the input device 1000 may be a peripheral coupled to a desktop computer, and the processing system 1010 may comprise software configured to run on a central processing unit of the desktop computer and one or more ICs (perhaps with associated firmware) separate from the central processing unit. As another example, the input device 1000 may be physically integrated in a phone, and the processing system 1010 may comprise circuits and firmware that are part of a main processor of the phone. In some embodiments, the processing system 1010 is dedicated to implementing the input device 1000. In other embodiments, the processing system 1010 also performs other functions, such as operating display screens, driving haptic actuators, etc.

The processing system 1010 may be implemented as a set of modules that handle different functions of the processing system 1010. Each module may comprise circuitry that is a part of the processing system 1010, firmware, software, or a combination thereof. In various embodiments, different combinations of modules may be used. Example modules include hardware operation modules for operating hardware such as sensing electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, mode changing modules for changing operation modes, and determination modules to determine force information for input objects touching the sensing region, as discussed above.

In accordance with some embodiments, a haptic module is configured to control an actuation of a haptic mechanism 1050 configured to haptically affect an input surface of the input device 1000 or otherwise provide haptic feedback to a user. Likewise, a force sensing module is configured to control a force sensor 1060 configured to determine a force applied to an input surface of the input device 1000. In one embodiment, for example, the force sensor 1060 and force sensing module may be configured to provide haptic feedback to the sensing region 1020. The processing system 1010 may also include sensing circuitry configured to sense input near or on the input surface using sensing electrodes in the sensing region 1020.

In some embodiments, the processing system 1010 responds to user input (or lack of user input) in the sensing region 1020 directly by causing one or more actions. Example actions include changing operation modes, as well as GUI actions such as cursor movement, selection, menu navigation, and other functions. In some embodiments, the processing system 1010 provides information about the input (or lack of input) to some part of the electronic system (e.g. to a central processing system of the electronic system that is separate from the processing system 1010, if such a separate central processing system exists). In some embodiments, some part of the electronic system processes information received from the processing system 1010 to act on user input, such as to facilitate a full range of actions, including mode changing actions and GUI actions.

For example, in some embodiments, the processing system 1010 operates the sensing element(s) of the input device 1000 to produce electrical signals indicative of input (or lack of input) in the sensing region 1020. The processing system 1010 may perform any appropriate amount of processing on the electrical signals in producing the information provided to the electronic system. For example, the processing system 1010 may digitize analog electrical signals obtained from the sensing electrodes. As another example, the processing system 1010 may perform filtering or other signal conditioning. As yet another example, the processing system 1010 may subtract or otherwise account for a baseline, such that the information reflects a difference between the electrical signals and the baseline. As yet further examples, the processing system 1010 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes position in a plane. Exemplary "three-dimensional" positional information includes position in space and position and magnitude of a velocity in a plane. Further examples include other representations of spatial information. Historical data regarding one or more types of positional information may also be determined and/or stored, including, for example, historical data that tracks position, motion, or instantaneous velocity over time. Likewise, a "position estimate" as used herein is intended to broadly encompass any estimate of object location regardless of format. For example, some embodiments may represent a position estimates as two dimensional "images" of object location. Other embodiments may use centroids of object location.

"Force information" as used herein is intended to broadly encompass information about force(s) regardless of format. Force information may be in any appropriate form and of any appropriate level of complexity. For example, some embodiments determine an estimate of a single resulting force regardless of the number of forces that combine to produce the resultant force (e.g. forces applied by one or more objects apply forces to an input surface). Some embodiments determine an estimate for the force applied by each object, when multiple objects simultaneously apply forces to the surface. As another example, force information may be of any number of bits of resolution. That is, the force information may be a single bit, indicating whether or not an applied force (or resultant force) is beyond a force threshold; or, the force information may be of multiple bits, and represent force to a finer resolution. As a further example, force information may indicate relative or absolute force measurements. As yet further examples, some embodiments combine force information to provide a map or an "image" of the force applied by the object(s) to the input surface. Historical data of force information may also be determined and/or stored. Likewise, the force information can be provided for each object as a vector or scalar quantity. As another example, the force information can be provided as an indication that determined force has or has not crossed a threshold amount. As other examples, the force information can also include time history components used for gesture recognition. As has been described, positional information and force information from the processing systems may be used to facilitate a full range of interface inputs, including use of the proximity sensor device as a pointing device for selection, cursor control, scrolling, and other functions.

In some embodiments, the input device 1000 is implemented with additional input components that are operated by the processing system 1010 or by some other processing system. These additional input components may provide redundant functionality for input in the sensing region 1020, or some other functionality. FIG. 10 shows buttons 1030 near the sensing region 1020 that can be used to facilitate selection of items using the input device 300. Other types of additional input components include sliders, balls, wheels, switches, and the like. Conversely, in some embodiments, the input device 1000 may be implemented with no other input components.

In some embodiments, the input device 1000 comprises a touch screen interface, and the sensing region 1020 overlaps at least part of an active area of a display screen. For example, the input device 1000 may comprise substantially transparent sensing electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 1000 and the display screen may share physical elements. For example, some embodiments may utilize some of the same electrical components for displaying and sensing. As another example, the display screen may be operated in part or in total by the processing system 1010.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 1010). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

The description and examples set forth herein were presented in order to best explain embodiments of the invention and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:
1. An electronic system comprising:
a capacitive input device comprising:
an input surface configured to rotate about a first axis, and
a first force sensor configured to sense a force applied to the input surface;
a processing system communicatively coupled to the capacitive input device, the processing system configured to:
determine positional information for each of at least one input object in contact with the input surface;
receive a force measurement from the first force sensor;
determine a force measurement for a first input object of the at least one input objects based upon a position of the first input object, the force measurement from the first force sensor and a location of the first force sensor relative to the first axis; and
determine a type of user input based upon the determined force measurement for the at least one input object.

2. The electronic system of claim 1, wherein the type of user input is selected from the group comprising: pointing, tapping, selecting, clicking, double clicking, panning, zooming and scrolling.

3. The electronic system of claim 1, wherein the determination of the type of user input is further based upon at least one of the determined positional information of the first input object and a duration of contact for the first input object.

4. The electronic system of claim 1, wherein the determined type of user input is a left click based upon at least one of the force measurement for the first input object meeting a first force range, a duration of contact for the first input meeting a first length of time, and the position of the first input object.

5. The electronic system of claim 1, wherein the processing system is further configured to determine an initiation or a rate of change of the type of user input based upon at least one of the determined force measurement for the first input object and the positional information of the first input object.

6. The electronic system of claim 1, wherein the electronic system comprises at least one of a desktop computer, a laptop computer, a tablet, a video game machine, a communication device and a media device.

7. The electronic system of claim 1, wherein the capacitive input device comprises at least one sensing element and the processing system is configured to determine positional information for the at least one input object in contact with the input surface by operating the at least one sensing elements by performing at least one of absolute capacitance sensing and mutual capacitance sensing.

8. The electronic system of claim 1, wherein the processing system is further configured to determine a differential force corresponding to a second input object which contacted the input surface substantially after the detection of the first input object.

9. The electronic system of claim 8, wherein the processing system is further configured to determine the type of user input based on at least one of the differential force, the determined positional information for the first and second input object, a duration of contact for the first input object, and a duration of contact for the second input object.

10. The electronic system of claim 9, type of user input is selected from the group comprising: pointing, tapping, selecting, clicking, double clicking, panning, zooming and scrolling, suppressing input from the first input object, suppressing input from the second input object, and suppressing all input objects.

11. The electronic system of claim 1, wherein the electronic system comprises a haptic module and the processing system is configured to actuate a haptic mechanism to provide haptic feedback to a user.

12. The electronic system of claim 1, wherein the capacitive input device further comprises a second force sensor configured to sense a force applied to the input surface and the processing system is further configured to receive a force measurement from the second force sensor and determine the force measurement for the first input object of the at least one input objects based upon a position of the first input object, the force measurements from the first and second force sensors and the location of the first and second force sensors relative to the first axis.

13. A processing system for an input device having an input surface configured to rotate about at least one axis, the processing system configured to be communicatively coupled to at least one force sensor and sense input in a sensing region of the input device surface, the processing system configured to:
   determine positional information for each of at least one input object in contact with the input surface;
   receive a force measurement from the at least one force sensor;
   determine a force measurement for a first input object of the at least one input objects based upon a position of the first input object, the force measurement from the at least one force sensor and a location of the force sensor relative to the first axis; and
   determine a type of user input based upon the determined force measurement for the at least one input object.

14. The processing system of claim 13, wherein the processing system is further configured to determine the type of input by:
   determining, when a single input object is in contact with the input surface, the type of input based upon the force measurement for the single input object and the determined positional information for the single input object,
   wherein the determined positional information includes at least one of a length of time the single input object was in contact with the input surface and a position of the single input object on the input surface.

15. The processing system of claim 13, wherein the processing system is further configured to determine the type of input by:
   determining, when multiple input objects are in contact with the input surface, if the input objects touched the input surface substantially simultaneously or if the input objects touched the input surface asynchronously.

16. The processing system of claim 15, wherein when the processing system determines that the input objects touched the input surface substantially simultaneously, the processor is further configured to:
   suppress input when at least one of the force measurement from the at least one force sensor and the determined positional information of the multiple input objects is within a predetermined range; and
   emulate a first time of user input when the at least one of the force measurement from the at least one force sensor and the determined positional information of the multiple input objects is outside the predetermined range,
   wherein the determined positional information includes at least one of a length of time the multiple input objects were in contact with the input surface and a position of the multiple input objects on the input surface.

17. The processing system of claim 15, wherein when the processing system determines that the input objects touched the input surface asynchronously, the processor is further configured to:
   determine if a landing area of a second input object is proximate to a landing area of the first input object.

18. The processing system of claim 17, wherein the processing system determines that if the landing area of the second input object is proximate to a landing area of the first input object, the processor is further configured to:
   suppress input when at least one of the force measurement from the at least one force sensor and the determined positional information of the multiple input objects is within a predetermined range; and
   emulate a first type of user input when the at least one of the force measurement from the at least one force sensor and the determined positional information of the multiple input objects is outside the predetermined range,
   wherein the determined positional information includes at least one of a length of time the multiple input objects were in contact with the input surface and a position of the multiple input objects on the input surface.

19. The processing system of claim 17, wherein when the processing system determines that if the landing area of the second input object is not proximate to a landing area of the first input object, the processor is further configured to:
   suppress input when at least one of the force measurement from the second input object and the determined positional information of the multiple input objects is within a predetermined range; and
   emulate a first type of user input when the at least one of the force measurement from the second input object and the determined positional information of the multiple input objects is outside the predetermined range,
   wherein the determined positional information includes at least one of a length of time the multiple input objects were in contact with the input surface and a position of the multiple input objects on the input surface.

20. The processing system of claim 19, wherein the processing system is configured to determine the force measurement from the second input object based upon the force measurement for the first input object, a position of the second input object, the force measurement from the at least one force sensor and a location of the force sensor relative to the first axis.

* * * * *